UNITED STATES PATENT OFFICE.

GEORGE WHIGELT, OF NEW YORK, N. Y.

NON-INFLAMMABLE SOLVENT FOR PAINTS AND THE LIKE.

1,156,119.      Specification of Letters Patent.      Patented Oct. 12, 1915.

No Drawing.      Application filed February 12, 1913. Serial No. 747,952.

*To all whom it may concern:*

Be it known that I, GEORGE WHIGELT, a citizen of the United States, and resident of Dongan Hills, in the county of Richmond, city and State of New York, have invented a new and useful Non-Inflammable Solvent for Paints and the like, of which the following is a specification.

My invention relates to a new composition of matter capable of dissolving and removing old paint and varnish and other coatings of kindred materials from wood, metal, stone and other surfaces. The new composition may also be used as an ingredient in the manufacture of paints and varnishes and allied materials to aid in the dissolving of gums, resinous materials, oils, fats, etc.

The new composition described below is of great practical value on account of its non-inflammable and non-explosive character and in view of the fact that its mixture with explosive and inflammable liquids will produce compounds retaining its non-explosive and non-inflammable properties. Furthermore it has been found that the admixture of waxes to prevent evaporation is not necessary as the basic products are of a high boiling point and volatile only to a very slight degree or not at all, retaining their solvent power indefinitely.

In preparing my improved composition of matter, adapted for use as a non-inflammable and non-explosive solvent or remover, I may make use of the following ingredients: (A) Halogen (and especially chlorin) derivatives of acetylene; as examples of substances in this group I will name dichlorethylene ($C_2H_2Cl_2$), trichlorethylene ($C_2HCl_3$) perchlorethylene ($C_2Cl_4$), tetrachlorethane ($C_2H_2Cl_4$) and pentachlorethane ($C_2HCl_5$). (B) Halogen (and especially chlorin) derivatives of glycerin or glycol; as examples of this group I will name monochlorhydrin ($C_3H_5Cl(HO)_2$), dichlorhydrin ($C_3H_5Cl_2HO$) and epichlorhydrin ($C_3H_5OCl$). (C) Oils, fats, waxes, greases, neutral liquid products of the distillation of coal or of petroleum (such as benzin), turpentine substitutes, paraffin oils, dead oil, and the like; these I will designate by the generic term of "oil". (D) Metallic soaps, among which I will name particularly alumina compounds such as stearate of alumina, and palmitate of alumina.

The composition must contain at least one ingredient of group A (that is to say, at least one halogen derivative of acetylene) and at least one ingredient of one of the other groups. Thus the composition may consist entirely of equal parts (by weight) of tetrachlorethane and dichlorhydrin. Or I may produce such a composition by mixing a halogen derivative of acetylene with an equal amount (by weight) composed of one or more substances or "oils" of group C. Again, I may obtain a serviceable composition by using a halogen derivative of acetylene in conjunction with an equal amount (by weight) composed of one or more metallic soaps (group D). The composition may contain ingredients taken from three of the above groups (but always including one or more ingredients from group A), or all four groups may be utilized in making the composition.

While a composition suitable for the purposes of my invention may be obtained by using one or more halogen derivatives of acetylene (group A) and one or more halogen derivatives of glycerin or glycol (group B), without adding any ingredient from groups C or D, such a composition would be too expensive in most cases. Therefore, in practice, for the purpose of reducing the cost of the finished product, I generally replace all or part of the ingredient of group B, with one or more ingredients of group C, group D, or groups C and D. The proportions I prefer to employ are 50 parts by weight consisting of one or more halogen derivaties of acetylene (group A), and 50 parts consisting of one or more ingredients of one or more of the other groups (B, C, D).

The use of metallic soaps and particularly alumina compounds such as stearate or palmitate of alumina (group D), facilitates the application of the composition.

Example I: 50 parts (by weight) of tetrachlorethane and 10 parts of dichlorhydrin are mixed under agitation, preferably at a temperature of say from 200° to 250° Fahrenheit, with 30 parts of dead oil and 10 parts of metallic soap, for instance palmitate of alumina. As soon as the mixture is homogeneous, it may be allowed to cool, and is then ready for use.

Example II: Same as Example I, but omit the metallic soap and increase the proportion of dead oil correspondingly to 40 parts.

Example III: Use 50 parts of tetrachlorethane, 5 parts of dichlorhydrin, 30 parts of benzin, and 15 parts of metallic soap, and proceed as in Example I.

Example IV: Use 50 parts tetrachlorethane, 30 parts of dead oil, and 20 parts of metallic soap (alumina compounds preferred) and proceed as in Example I.

My improved composition of matter is not only itself non-inflammable and non-explosive, but imparts these properties to mixtures containing it and explosive or inflammable constituents such as benzin. Its use is therefore perfectly safe. It is an efficient solvent for paint, varnish and the like, and may therefore be used to remove paint etc. from walls or other surfaces. It may also, as stated hereinbefore, be used as an ingredient in the manufacture of paints and the like, to assist in the dissolving of gums, resinous materials, oils, fats, etc. The composition is not volatile at all, or only to a very slight degree, and will therefore preserve its solvent power indefinitely. While I may use waxes as ingredients of my composition, their addition would not be for the purpose of preventing evaporation. The composition is a heavy liquid, generally of a light yellowish cast.

I claim:

1. The herein described composition of matter, containing a "halogen derivative of acetylene" constituent and a "halogen derivative of glycerin or glycol" constituent in such proportions as to form a non-inflammable solvent for paints and the like.

2. The herein described composition of matter, containing a "halogen derivative of acetylene" constituent and a metallic soap constituent in such proportions as to form a non-inflammable solvent for paints and the like.

3. The herein described composition of matter, containing a "halogen derivative of acetylene" constituent, a "halogen derivative of glycerin or glycol" constituent, and an "oil" constituent in such proportions as to form a non-inflammable solvent for paints and the like.

4. The herein described composition of matter, containing a "halogen derivative of acetylene" constituent, a "halogen derivative of glycerin or glycol" constituent, and a metallic soap constituent in such proportions as to form a non-inflammable solvent for paints and the like.

5. The herein described composition of matter, containing a "halogen derivative of acetylene" constituent, a "halogen derivative of glycerin or glycol" constituent, an "oil" constituent, and a metallic soap constituent in such proportions as to form a non-inflammable solvent for paints and the like.

6. The herein described composition of matter, containing 50 parts of tetrachlorethane, 10 parts of dichlorhydrin, and 40 parts of dead oil.

In testimony whereof I have signed this specification in the presence of two subscribing witnesses.

GEORGE WHIGELT.

Witnesses:
HUGH J. CAMPBELL,
JOHN LOTKA.